United States Patent [19]

Ewing et al.

[11] Patent Number: 5,274,794
[45] Date of Patent: Dec. 28, 1993

[54] METHOD AND APPARATUS FOR TRANSFERRING COORDINATE DATA BETWEEN A HOST COMPUTER AND DISPLAY DEVICE

[75] Inventors: Bland Ewing, Chico; William A. Eckert, San Jose, both of Calif.

[73] Assignee: GraphOn Corporation, Campbell, Calif.

[21] Appl. No.: 643,738

[22] Filed: Jan. 22, 1991

[51] Int. Cl.⁵ .............................................. G06F 3/00
[52] U.S. Cl. ................................. 395/500; 364/260.1; 364/260.4; 364/258; 364/284; 364/DIG. 1
[58] Field of Search ................. 395/500, 200; 358/11

[56] References Cited

U.S. PATENT DOCUMENTS

| | | | |
|---|---|---|---|
| 4,797,945 | 1/1989 | Suzuki | 382/56 |
| 5,047,853 | 10/1991 | Hoffert | 358/133 |
| 5,049,992 | 9/1991 | Citta | 358/11 |
| 5,058,185 | 10/1991 | Morris | 382/41 |
| 5,115,809 | 10/1992 | Baker | 395/200 |
| 5,131,057 | 7/1992 | Walowit | 382/41 |
| 5,185,883 | 2/1993 | Ianni | 395/575 |

*Primary Examiner*—Robert B. Harrell
*Assistant Examiner*—Eric Coleman
*Attorney, Agent, or Firm*—Albert C. Smith; Phong K. Truong

[57] ABSTRACT

The method and apparatus for efficiently storing or transmitting related sets of data such as X, Y coordinate data determines the resolution of a display device and the transmission limitations of a communication channel to the display device and encodes a selected portion of the bitmap for display with associated offsets and additional information as a complex number according to a variable-radix polynomial, where the number is segmented into selected bytes for transmission within the operating limitations of the communication channel for decoding and restoration of offsets by the display device.

10 Claims, 5 Drawing Sheets

METHOD AND APPARATUS FOR TRANSFERRING COORDINATE DATA BETWEEN A HOST COMPUTER AND DISPLAY DEVICE

BACKGROUND AND SUMMARY OF INVENTION

The effective encoding and transmission of XY coordinate data between a host computer and a graphics display device has long been an issue in computer graphics. Generally, each XY coordinate is encoded into a short stream of bytes which is then transmitted to the display device. Many schemes have been developed to encode these coordinates, some with the goal of maintaining human readability, others with the goal of simple decoding by hardware logic in the receiving device.

Conventional hardware oriented implementations use groups of bits in transmitted bytes to hold partial XY coordinate data. The receiving device accumulates bits from several bytes to obtain a complete XY specification. Some of these conventional methods use one or two bits in each byte to specify which parts of the XY coordinate are represented by the other data bits. While such conventional methods can be fairly compact, They are most efficient when dealing in numbers which are powers of two because fixed numbers of bits can be dedicated to representing each of the X and Y values.

As graphic systems have increased in performance, users' expectations for that performance have increased. However, the transmission media currently available to transfer data from a host computer system to a graphics display device vary greatly in bandwidth, ranging from thousands of bits per second to tens of millions of bits per second. The most readily available and least expensive communications media are at the low end of that range. Meeting high performance expectations over a low bandwidth transmission line requires very efficient encoding of XY coordinate data.

Another consideration in sending XY coordinate data to a receiving system is that the data is often sent over a communications path which puts restrictions on the byte values that may be transmitted. For example, the characteristics of the communications path may be such that either 7 or 8 bits of each byte are accessible to the sender and receiver. Thus, the encoding scheme must be able to function in environments where the magnitude of the value transmitted in each byte may be either $2^8=256$ or $2^7=128$. In practice, the range of values which a byte may take is reduced even further, as some specific values may be reserved for system and other uses.

The present invention provides a method and apparatus for the efficient encoding of absolute XY data, that involves combining XY (and possibly additional) data into a single value using a mixed radix polynomial. This value is fully independent of the characteristics of the communications path, and can be broken down into a number of bytes which are compatible with the communications path. This is done using a fixed radix polynomial. The result is a smaller number of bytes being transmitted than is generally possible with existing encoding schemes, in practice as few as three bytes for a 2560×2560 pixel display, using only 190 of the 256 values available in an 8-bit byte.

The encoding is based on the vertical and horizontal resolution of the graphics bitmap. Resolutions need not be a power of two, and the bitmap being addressed need not have a 1:1 aspect ratio. For example, a bitmap with a resolution of 800×600 can be accommodated efficiently. The maximum resolution which can be encoded is unlimited in theory, and in practice is limited only by the ability of the sending and receiving devices to perform sufficiently long multiplications and divisions efficiently.

The present invention adjusts to the resolution of the XY coordinates being transmitted and lower resolution bitmaps can be addressed by transmitting fewer bytes of data than must be sent for higher resolution bitmaps.

Fewer bytes than necessary to address the entire bitmap may be sent whenever it is permissible to address only a sub-window of the bitmap. The encoding scheme requires that each encoded number includes a limited range of values between 0 and a positive maximum. However, by applying previously established offsets to the coordinates before they are encoded, and removing the offsets after they are decoded, this sub-window may be located anywhere in the larger bitmap. With use of correct offsets, any contiguous range of negative and/or positive integers may be encoded.

It is also possible to encode coordinates with resolutions higher than those of the on-screen bitmap. This is useful when addressing a larger bitmap which is displayed on a small screen acting as a viewport which may be moved around the larger bitmap by the user, without forcing the retransmission of graphic data as the viewport is moved. It also allows a low resolution device to display a portion of an image created for display on a higher resolution device.

Once the sending and receiving devices have determined the number of bytes required to encode an arbitrary XY coordinate, it is usually the case that an additional value can be encoded without increasing the number of bytes required. This can be used, for example, to allow graphics commands to be encoded into the XY data without incurring any additional transmission overhead. Multiple additional values can be encoded if so desired.

In general, the coordinate system encoded according to the present invention may be n-dimensional. The data being encoded may include coordinates for two or three dimensional graphics data, as well as other data. The encoded data need not include XY or XYZ coordinate data at all, but rather may include any finite set of values whose members have finite ranges. Examples include the encoding and decoding of XY coordinates and a color, or XYZ coordinates and a color, or XYZ coordinates and a color and one or more commands such as, for example, a command to draw a circle, the XY coordinates of its center, the length of its radius, its color, the width of the line used to draw it, and an index into a list of patterns for that line.

The transmitted data can be packaged in such a way that transmission paths which can handle 7 or 8 bit bytes can be used efficiently, and the bytes that are created can avoid certain ranges of codes, for use in transmitting non-XY data.

The encoding scheme compresses many types of data better than a simple ASCII encoding, but also better than even the "binary" information stored on mass storage devices A single instance of a variable of the enumerated type of the Pascal computer language is generally stored as a 16-bit value in a binary file. Using this encoding, only the number of states of that enumerated type is encoded, generally allowing many enumerated types to be stored in a very small number of bytes. A single byte could hold up to five of these variables having three states apiece—a binary file would generally save these in ten bytes.

The present invention is effective for use over communications paths of any bandwidth, and to and from mass storage and retrieval systems. While the examples show transmission over a byte-wise communications path, it will adapt to a path of any width, including local busses within a computer.

DESCRIPTION OF THE PREFERRED EMBODIMENT

Figure 1:
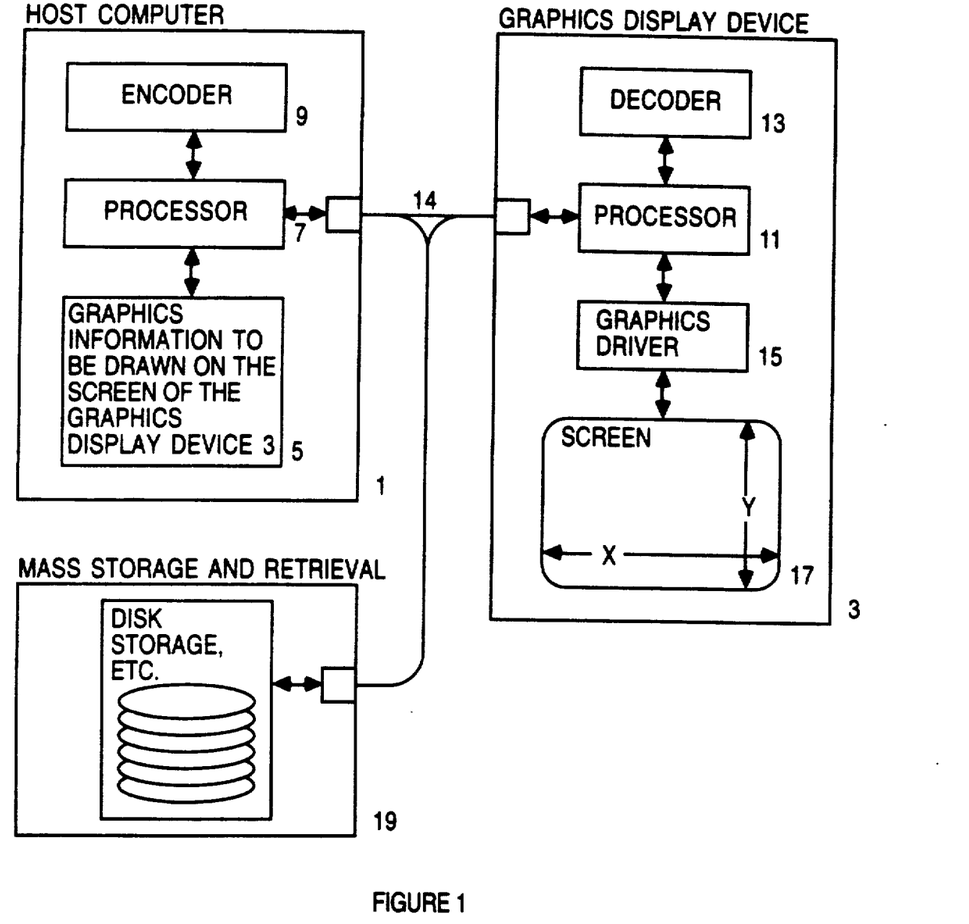
FIG. 1 is a block schematic diagram of the system according to one embodiment of the present invention for communicating processed data over ASCII-compatible, byte-oriented channels.

Referring now to FIG. 1, there is shown a flow chart illustrating an embodiment of the present invention in a bit-mapped graphics terminal and in corresponding software running in a host computer, communicating over a communications path which transmits ASCII-compatible, byte-oriented data. The encoding scheme is used to encode two dimensional XY coordinate data with a third value, called C.

In operation, the host computer 1 causes graphic data to be displayed on the screen 17 of a remote graphics display device 3. The processor 7 operating under program control 5 generates graphics data in conventional manner, for example, from image data, in a 'windows' operating system to be sent to the graphics display device in the form of vectors, filled rectangles, positioning information for text strings, and the like. The processor 7 in the host computer 1 controls the encoding 9 of each pair of XY coordinates with an index C into a table of graphics commands. The data is encoded 9 in conventional manner, for example, under program control of processor 7 such that the resulting bytes do not include any instances of bytes in the ranges of ASCII control codes.

These encoded coordinates and graphics commands are then transmitted 14 to the graphics display device 3 which includes processor 11 that controls the decoding 13 in conventional manner, for example, under program control of processor 11, of the coordinates and the index C into the table of graphics commands. Of course, the processors 7 and 11 may comprise the same processor in a system in which the proximate location of host computer 1 and device 3 permit sharing of the common processor. The command index and the XY coordinates are passed to the graphics driver 15 of convention design which draws the correct vector, filled rectangle, and the like, for example, under program control of processor 11, into the bitmap for display on the screen 17.

Alternatively, short or long term storage of the encoded data may occur in a mass storage and retrieval system 19, without the encoded data being sent to the graphics display device, for access by the host computer 1, or by an alternate host computer (not shown), or for access by the graphics display device 3, as shown.

The ranges of X and Y may be equal to the horizontal and vertical resolution of the bitmap to be addressed (which is usually, but not necessarily, the entire bitmap as displayed on the graphics display device's CRT). The range of C is limited to that which will encode into the outgoing data without requiring that an additional data byte be sent. However, if its range is large enough, C may be transmitted "for free" with each outgoing XY coordinate.

In this embodiment, C may be used to encode mode switching commands into the XY data. For example, one value of C indicates that the following XYs are to be used to draw vectors, while another value of C specifies that the following XYs are to be used to draw filled rectangles.

Figure 2:
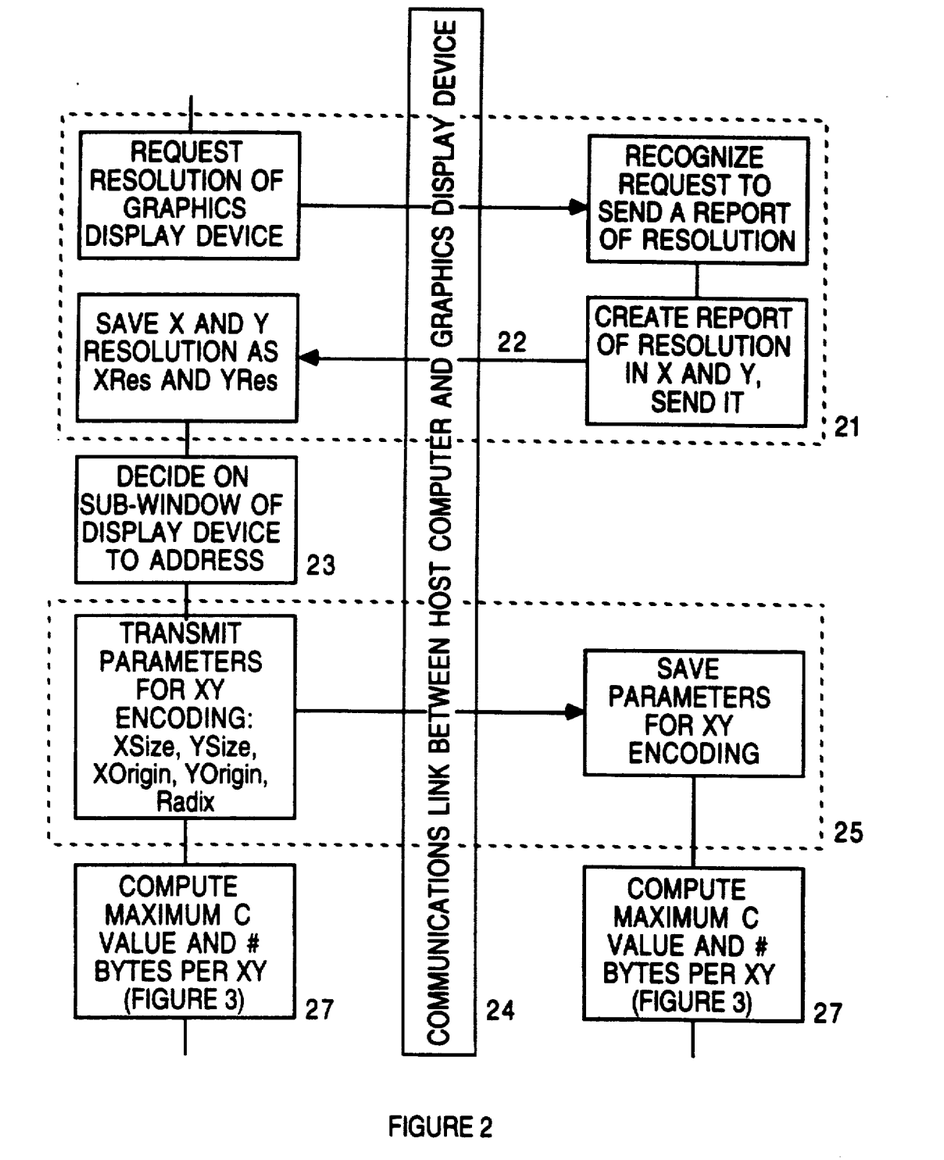
FIG. 2 is a flow chart illustrating the initialization process for an encoding/decoding system according to the present invention.

Referring now to FIG. 2, there is shown a flow chart illustrating the process for the initialization of the encoding/decoding system of FIG. 1 according to the present invention. The host computer 1 either knows the resolution of the graphics display device 3, or it must query 21 the device for that information. With the refined report 22 of the resolution of the destination display 3, or with that information previously provided, the host computer 1 saves the resolution in Xres and YRes. The host computer 1 then determines the area, or "sub-window" of the bitmap into which it wishes to draw, saving the size of the sub-window in XSize and YSize and saving 23 the coordinates of the origin of the sub-window in XOrigin and YOrigin. Additionally, the host computer 1 also receives information about whether the communications path 24 is capable of transmitting 7- or 8-bit bytes of data.

The host computer 1 then sends to the graphics display device 3 the parameters to be applied in the encoding and decoding process 25. It sends the resolution in X and Y of the window on the screen into which the host computer 1 wishes to draw, called XSize and YSize. In addition, the host computer sends the origin of that window, called XOrigin and YOrigin, allowing it to be placed at the desired location in the bitmap of the display device. Also, the host computer 1 sends Radix, which is the magnitude of the value that is contained in each byte sent over the communications path 24. This initialization process may be repeated at any time during the drawing of single or multiple graphics images, redirecting the drawing commands to different sub-windows to maintain an optimally compact stream of coordinate data.

Figure 3:
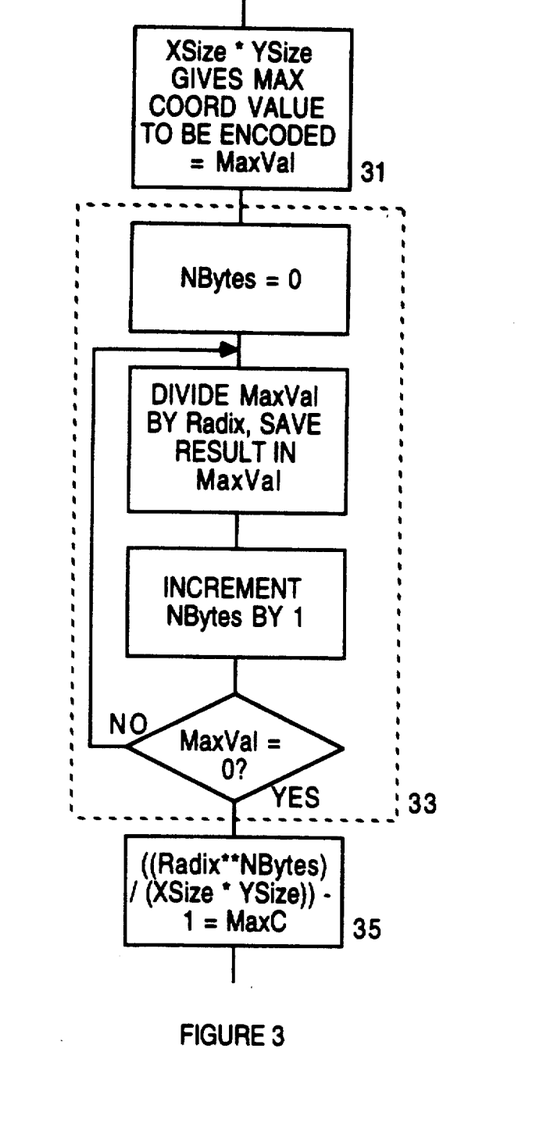
FIG. 3 is a flow chart illustrating the computation logic according to the present invention.

Now that both sender and receiver have the necessary parameters, they can each determine the number of bytes which are to be sent for each pair of XY coordinates. This is accomplished, as illustrated in FIG. 3, by multiplying XSize and YSize together 31 giving MaxVal. MaxVal is the minimum value which must be transmitted to allow all necessary values of X and Y to be encoded. Next, the minimum number of bytes which must be transmitted to send MaxVal is computed by repeatedly dividing MaxVal by Radix 33 until MaxVal becomes zero. The number of divides executed is saved as NBytes, which is the minimum number of bytes required to transmit an XY coordinate. Finally, the maximum value of C which may be encoded in NBytes bytes is computed 35 by raising Radix to the power of NBytes. Dividing this value by XSite * YSite subtracting 1 gives the remaining component of the transmitted value 35 that is available for encoding C.

For example, the graphics display device 3 may report to the host computer that its bitmap display 17 has a resolution of 800×600 pixels. The host computer 1 wishes to draw into the entire bitmap. The communications path 24 between the host 1 and the display device 3 can carry 8-bit data and the encoding scheme should avoid generating ASCII control codes (in the range of binary values 0 through 31, 127 through 159, and 255). Of course, other conventional computer codes such as EBCDIC may also be used, most of which have different but analogous codes which must be avoided. The host computer 1 then communicates 25 to the display device 3 that XY coordinates will be sent with a magnitude of X (XRes=800) and Y (YRes=600), that the offset to the origin of the coordinate space over the bitmap is (0,0)(XOrigin=0, YOrigin=0), and that transmitted bytes will contain values 0 through 189 offset so that ASCII control codes are never transmitted. (Radix=190). Each device 1, 3 then determines that three bytes must be transmitted to define a single XY location, and that C may take on values of 0 through 13.

Figure 4:
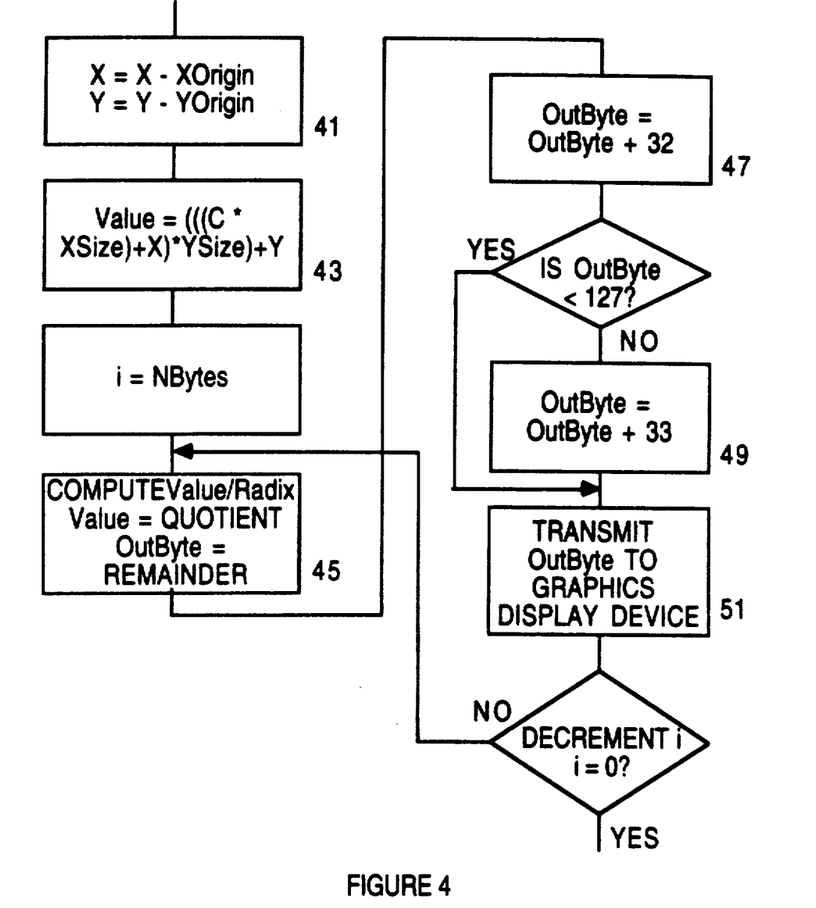
FIG. 4 is a flow chart illustrating the process for encoding XY coordinate data and a command table index, C, for transmission to a graphics display device.

Once the system is initialized, XY coordinate data and a command table index C may be encoded for transmission to the graphics display device 3 as shown in FIG. 4. To encode the X, Y and C values, first the coordinate space of the display window 17 is shifted so that X and Y values of 0, 1, 2 . . . are transmitted 41. Then, Value is determined by solving a mixed radix polynomial 43. The general form of the polynomial is:

$$Value = A(AMag*BMag* \ldots *nMag) + \quad \text{(Eq. 1)}$$
$$B(BMag* \ldots *nMag) + \ldots + n$$

where the values to be encoded are the nonnegative integers
$A, B, \ldots, n$ such that:
$0 \leq A \leq AMag - 1$
$0 \leq B \leq BMag - 1$
$\ldots$
$0 \leq n \leq nMag - 1$
The specific form used in this embodiment is:
$Value = C(XSize*YSize) + X(YSize) + Y$ "Value", which is unique for all valid values of X, Y and C, is then divided into NBytes bytes using the following fixed radix polynomial:

$$Value = byte_1 (Radix^{NBytes-1}) + \ldots + \quad \text{(Eq. 2)}$$
$$byte_{NBytes-1} (Radix^1) + byte_{NBytes}$$

In this embodiment, the polynomial is solved by dividing Value by Radix a number (NBytes) of times. Each time, the quotient is placed back into Value, and the remainder is placed in OutByte 45, then offset 47 by adding 32. This puts OutByte out of range of ASCII control codes 0 through 31. If OutByte is less than 127, it is in the range of ASCII graphic codes 32 through 126 and it can be sent to the graphics display device. If OutByte is 127 or greater, it is offset 49 again by adding 33, which ensures that it will not be an ASCII control code 127 through 159, and moves it into the range of ASCII graphic characters 160 through 254. The ASCII code 255 is avoided by the proper choice of Radix and by encoding only valid values of X, Y, and C. The altered byte in OutByte is then sent 51 to the graphics display device 3. This process is repeated until NBytes bytes have been sent by the host.

Offsetting each byte in this manner leaves the control codes of the standard ASCII character set free for use as commands rather than as XY data.

Continuing the example using the 800×600 pixel coordinate space, the host computer 1 may wish to encode the coordinates (for example, 757,144) with a command which is specified by encoding a C value of 2. First, it subtracts the origin (0,0) leaving the coordinates unchanged at (757,144). Then, it applies the polynomial from Eq. 1:

Value = 2(800*600) + 757(600) + 144
Value = 1,414,344

Figure 5:
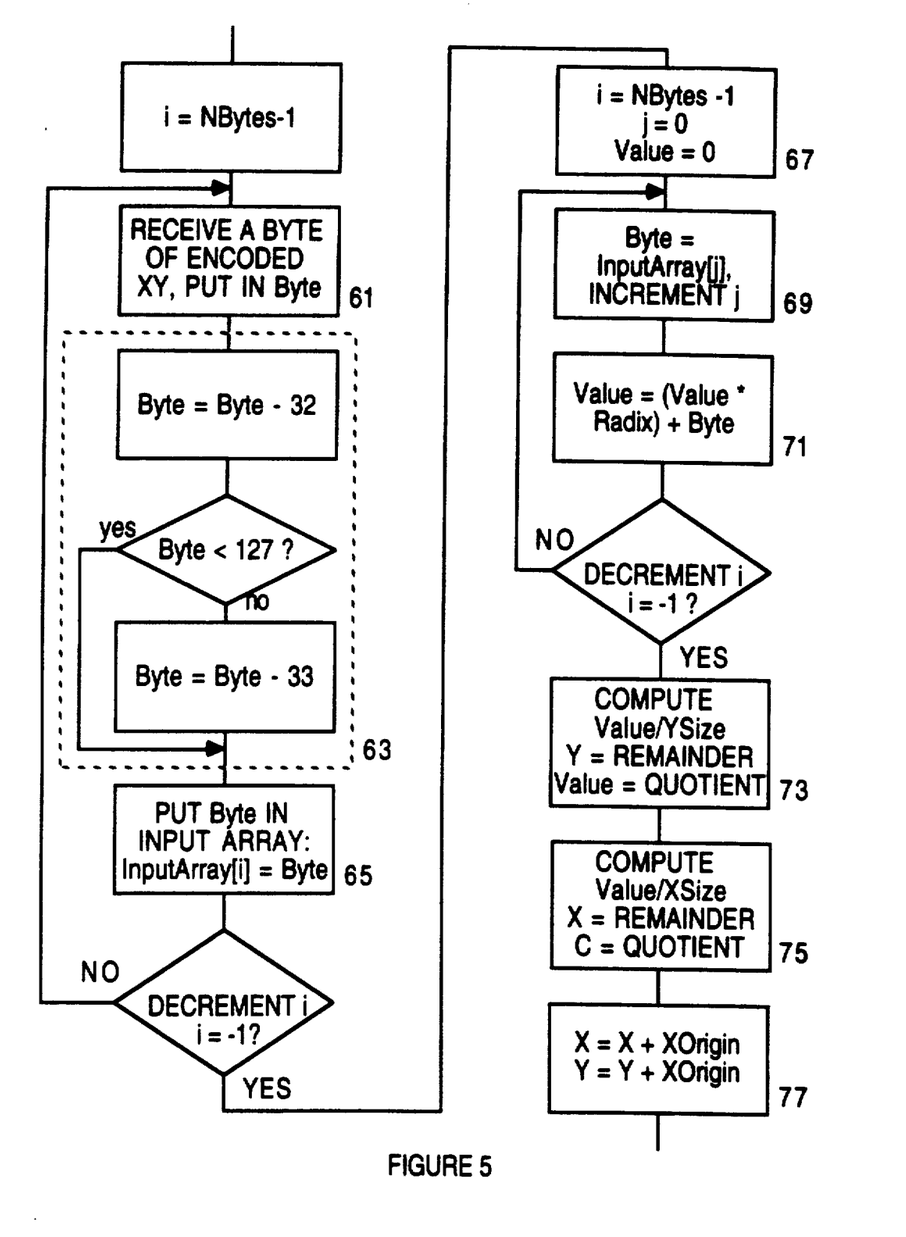
FIG. 5 is a flow chart illustrating the process for decoding encoded XY and C data according to the present invention.

With this value for Value, $byte_1$ through $byte_{NBytes}$ can be determined according to the polynomial (from Eq. 2) using the repeated division described above:

OutByte = Value mod Radix = 1,414,344 mod 190 = 174
Value = Value/Radix = 1,414,344/190 = 7443
OutByte = 174 + 32 + 33 (because 174 + 32 > 126) = 239
transmit byte value 239 to the display device OutByte = Value mod Radix = 7443 mod 190 = 33
Value = Value/Radix = 7443/190 = 39
OutByte = 33 + 32 = 65
transmit byte value 65 to the display device OutByte = Value mod Radix = 39 mod 190 = 39
Value = Value/Radix = 39/190 = 0
OutByte = 39 + 32 = 71
transmit byte value 71 to the display device Thus, in this example, the coordinates (757,144) and the C value of 2 encode to three bytes with values 239,65,71. Referring now to FIG. 5, the flow chart illustrates the reverse steps executed by the graphics display device 3 to decode the data sent by the host computer 1 into X, Y and C. First, the display device 3 receives NBytes bytes via the communications path 24. As each byte is received, it is placed in a variable called Byte 61. The offsets which were added in the encoding step to ensure that no transmitted bytes were in the range of ASCII control codes are now removed 63. Then Byte is placed in a receive buffer, called InputArray 65, in reverse order, that is, the first byte received is put in the last position in the buffer, and so on.

Once NBytes bytes have been loaded into InputArray 65, the variable value is initialized to zero and the array index variable j is initialized 67 to zero. Then a loop 69, 71 is entered to process each byte in InputArray. Each time through the loop, Byte is loaded by pulling a byte out of InputArray at index j and j is incremented 69 by 1. Value is multiplied by Radix and Byte is added 71 to it, yielding a new value for Value. These steps are repeated NBytes times, until each received byte is processed. The resulting Value is the same as the value of Value determined when the coordinates were encoded in the host computer 1.

Value is then broken down into its component X, Y and C parts according to the polynomial (from Eq. 1) above. When Value is divided 73 by YSize, the remainder is Y. When the quotient is further divided 75 by XSize, the remainder is X and the quotient is C. Finally, X and Y are translated 77 by adding the coordinates of the origin of the transmitted coordinate space over the destination bitmap.

In another embodiment of the present invention in which a mass storage and retrieval device 19 is used to hold the encoded data, the form in which the data is stored would depend upon the final use of that data. If it is being stored for subsequent transmission to a remote display device, it may be stored exactly as generated or encoded according to the preceding description. If instead it is to be recalled by the originating host computer for use without having to be transmitted over a restrictive data path, then the intermediate values (called Value, above) for the XY may be stored without breaking it up into bytes, as described above, for transmission. Using numeric data from the example above, the sample XY could be stored as the three byte values 239,65,71 or as the single number 1,414,344. Depending on how large numbers are stored by and retrieved from the mass storage and retrieval device, it may be more compact and efficient to store the three-byte values.

The variables required to encode and decode each X, Y, and C as described in this embodiment are XSize, XOrigin, YSize, YOrigin, MaxC, Radix, and NBytes. (The origin of C is fixed at zero.) If the transmitting and receiving devices keep a set of these eight variables for each of multiple windows, it becomes possible to change encoding on the fly, window by window. Generalizing this for an n-dimensional system requires that the devices keep 2n+2 variables per window.

What is claimed is:

1. A method for transferring a set of data whose members (A', B' ... n') have selected independent ranges of values between a host computer and a remote device along a communication channel, comprising the steps of:
   for each member (A', B' ... n') of the set of data, determining a range of values the member may take on, each range having a magnitude (AMag, BMag, ..., nMag) indicating the size of the range;
   for each member (A', B' ... n') of the set of data, selecting an offset value (AOffs, BOffs, ..., nOffs) associated with said member;
   transferring to the remote device information regarding the magnitudes (AMag, BMag, ... nMag) of the ranges and the offsets (AOffs, BOffs, ..., nOffs) associated with the members of the set of data;
   deriving a set of translated data (A, B, ..., n) by subtracting from each member (A', B' ... n') of the data set the offset (AOffs, BOffs, ..., nOffs) value associated with said member; and
   converting the set of translated data (A, B, ... n) to a single number (V) in accordance with the equation:

$$V = A(A\text{Mag} \times B\text{Mag} \, x \ldots x \, n\text{Mag}) +$$
$$B(B\text{Mag} \, x \ldots x \, n\text{Mag}) + n.$$

2. The method of claim 1 wherein the communication channel includes operating limitations, the method comprising the additional step of:
   determining a number of data words required to communicate the set of data to the remote device along the communication channel in accordance with a first logical combination which multiplies the magnitudes (AMag, BMag, ... nMag) of the ranges with each other to produce a multiplied range magnitude, and which successively divides a number of times the multiplied range magnitude by a number (R) of available different values that can be transferred in a data word along the communication channel to yield zero quotient, said number of times constituting the number of data words required to communicate said set of data.

3. The method according to claim 2 comprising the additional steps of:
   communicating the number (R) of available different values to the remote device along the communication channel; and
   determining the values of the data words to send to said remote device in accordance with a second logical combination which successively divides the value (V) by the number (R) to yield remainder quantities for transfer to the remote device along the communication channel.

4. The method according to claim 3 for transferring the values of the data words along a communication channel operable on a set of ASCII codes, the method comprising the additional steps:
   modifying the values of the data words in accordance with a third logical combination which adds 32 to the value of each data word to produce an altered value of data word, and which adds 33 to any altered value of data word greater than 126; and
   supplying the modified data words to the remote device.

5. The method according to claim 3 comprising the additional steps of:
   accumulating in the remote device a plurality of remainder quantities in sequence;
   retrieving the accumulated remainder quantities in reverse sequence for reproducing the value (V) in accordance with the inverse of said second logical combination;
   forming the set of translated data (A, B, ..., n) from the reproduced value of (V) in accordance with the inverse of said equation; and
   restoring each member (A', B', ... n') of the set of data by adding to each member of the set of translated data (A, B, ..., n) a corresponding offset value (AOffs, BOffs, ..., nOffs).

6. Apparatus for transferring a set of data whose members (A', B' ... n') have selected independent ranges of values between a host computer and a remote device, comprising:
   means for determining, for each member (A', B', ... n') of the set of data, a range of values the member may take on, each range having a magnitude (AMag, Bmag, ..., nMag) indicating the size of the range;
   means for selecting, for each member (A', B' ... n') of the set of data, an offset value (AOffs, BOffs, ... nOffs) associated with said member;
   a communication channel connected for transferring to the remote device information regarding the magnitudes (AMag, BMag, ..., nMag) of the ranges and the offsets (AOffs, BOffs, ..., nOffs) associated with the members of the set of data;
   deriving means for deriving a set of translated data (A, B, ... n) by subtracting from each member (A', B', ... n') of the set of data the offset (AOffs, BOffs, ..., nOffs) value associated with said member; and
   means for converting the set of translated data (A, B, ... n) to a single number (V) in accordance with the equation:

$$V = A(A\text{Mag} \times B\text{Mag} \, x \ldots x \, n\text{Mag}) +$$
$$B(B\text{Mag} \, x \ldots x \, n\text{Mag}) + n.$$

7. Apparatus according to claim 6 wherein the communication channel includes operating limitations, further comprising:

means for determining a number of data words required to communicate the set of data to the remote device along the communication channel in accordance with a first logical combination which multiplies the magnitudes (AMag, BMag, . . . nMag) of the ranges with each other to produce a multiplied range magnitude, and which successively divides a number of times the multiplied range magnitude by a number (R) of available different values that can be transferred in a data word along the communication channel to yield zero quotient, wherein said number of times constituting the number of data words required to communicate said set of data.

8. Apparatus according to claim 7 further comprising:

means for communicating the number (R) of available different values to the remote device along the communication channel; and means for determining the values of the data words to send to said remote device in accordance with a second logical combination which successively divides the value (V) by the number (R) to yield remainder quantities for transfer to the remote device along the communication channel.

9. Apparatus according to claim 8 for transferring the values of the data words along a communication channel operable on a set of ASCII codes, the apparatus further comprising:

means for modifying the values of the data words in accordance with a third logical combination which adds 32 to the value of each data word to produce an altered value of data word, and which adds 33 to any altered value of data word greater than 126.

10. Apparatus according to claim 8 further comprising:

means in the remote device for accumulating a plurality of remainder quantities in sequence;

means for retrieving the accumulated remainder quantities in reverse sequence for reproducing the value (V) in accordance with the inverse of said second logical combination;

means for forming the set of translated data (A, B, . . . , n) from the reproduced value of (V) in accordance with the inverse of said equation; and means for restoring each member of the set of data (A', B', . . . , n') by adding to each member of the set of translated data (A, B, . . . , n) a corresponding offset value (AOffs, BOffs, . . . , nOffs).

* * * * *